(12) United States Patent
Danley et al.

(10) Patent No.: US 8,985,866 B2
(45) Date of Patent: Mar. 24, 2015

(54) SIMULTANEOUS THERMAL FORMING OF FERRULE AND OPTICAL FIBER IN A FERRULE ASSEMBLY TO THERMALLY FORM AN OPTICAL SURFACE IN THE FERRULE ASSEMBLY, AND RELATED FIBER OPTIC COMPONENTS, FIBER CONNECTORS, ASSEMBLIES, AND METHODS

(71) Applicants: Jeffrey Dean Danley, Hickory, NC (US); Robert Bruce Elkins, II, Hickory, NC (US); Daniel Warren Hawtof, Corning, NY (US)

(72) Inventors: Jeffrey Dean Danley, Hickory, NC (US); Robert Bruce Elkins, II, Hickory, NC (US); Daniel Warren Hawtof, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 189 days.

(21) Appl. No.: 13/769,541

(22) Filed: Feb. 18, 2013

(65) Prior Publication Data

US 2013/0343710 A1 Dec. 26, 2013

Related U.S. Application Data

(60) Provisional application No. 61/662,040, filed on Jun. 20, 2012.

(51) Int. Cl.
  *G02B 6/36* (2006.01)
  *G02B 6/38* (2006.01)

(52) U.S. Cl.
  CPC ............... *G02B 6/36* (2013.01); *G02B 6/3846* (2013.01); *G02B 6/3854* (2013.01); *G02B 6/3863* (2013.01)

USPC .................................................. 385/85; 385/78

(58) Field of Classification Search
  USPC .................................................. 385/78, 84, 85
  See application file for complete search history.

(56) References Cited

U.S. PATENT DOCUMENTS

| | | | |
|---|---|---|---|
| 4,147,402 A | 4/1979 | Chown | 350/96.18 |
| 4,345,930 A | 8/1982 | Basola et al. | 65/102 |
| 4,510,005 A | 4/1985 | Nijman | 156/221 |
| 4,678,268 A | 7/1987 | Russo et al. | 350/96.18 |
| 4,859,827 A | 8/1989 | Coyle, Jr. et al. | 219/121.64 |
| 4,932,989 A | 6/1990 | Presby | 65/2 |
| 5,011,254 A | 4/1991 | Edwards et al. | 350/96.18 |
| 5,101,090 A | 3/1992 | Coyle, Jr. et al. | 219/121.68 |
| 5,226,101 A | 7/1993 | Szentesi et al. | 385/85 |

(Continued)

FOREIGN PATENT DOCUMENTS

| | | | | |
|---|---|---|---|---|
| EP | 0905534 B1 | 11/2003 | | G02B 6/38 |
| WO | 01/61394 A1 | 8/2001 | | G02B 6/26 |

(Continued)

*Primary Examiner* — Daniel Petkovsek (57) ABSTRACT

Simultaneous thermal forming of a ferrule and optical fiber as part of a ferrule assembly to thermally form an optical surface in the ferrule assembly. Related fiber optic components, connectors, assemblies, and methods are disclosed. In certain embodiments, the ferrule assembly is comprised of a ferrule and an optical fiber having an end portion extending from an end face of the ferrule. The ferrule may be made from a material or material composition having the same or similar thermal energy absorption characteristics as the optical fiber disposed in the ferrule. Thus, when the end face of the ferrule and an end portion of an optical fiber are simultaneously exposed to a wavelength(s) of a laser beam emitted by a laser, at least a portion of the end face of the ferrule and end portion of the optical fiber are both thermally formed together to form an optical surface.

19 Claims, 10 Drawing Sheets

(56) References Cited

U.S. PATENT DOCUMENTS

| | | | |
|---|---|---|---|
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 6,139,196 A | 10/2000 | Feth et al. | 385/97 |
| 6,246,026 B1 | 6/2001 | Vergeest | 219/121.72 |
| 6,282,349 B1 | 8/2001 | Griffin | 385/81 |
| 6,331,081 B1 * | 12/2001 | Ohtsuka et al. | 385/85 |
| 6,350,062 B2 * | 2/2002 | Knecht et al. | 385/84 |
| 6,361,219 B1 | 3/2002 | Blyler, Jr. et al. | 385/85 |
| 6,413,450 B1 | 7/2002 | Mays, Jr. | 264/1.27 |
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |

FOREIGN PATENT DOCUMENTS

| | | | | |
|---|---|---|---|---|
| WO | 01/61395 A1 | 8/2001 | | G02B 6/26 |
| WO | 01/61870 A2 | 8/2001 | | |
| WO | 2004/003612 A1 | 1/2004 | | G02B 6/25 |
| WO | 2008/103239 A1 | 8/2008 | | B23K 26/00 |
| WO | WO2013192122 A1 | 12/2013 | | G02B 6/38 |

* cited by examiner

SIMULTANEOUS THERMAL FORMING OF FERRULE AND OPTICAL FIBER IN A FERRULE ASSEMBLY TO THERMALLY FORM AN OPTICAL SURFACE IN THE FERRULE ASSEMBLY, AND RELATED FIBER OPTIC COMPONENTS, FIBER CONNECTORS, ASSEMBLIES, AND METHODS

RELATED APPLICATIONS

This application claims the benefit of priority under 35 U.S.C. §119 of U.S. Provisional Application Ser. No. 61/662,040 filed on Jun. 20, 2012, the content of which is relied upon and incorporated herein by reference in its entirety.

BACKGROUND

1. Field of the Disclosure

The technology of the disclosure relates to creating optical surfaces at the end portions of optical fibers disposed in ferrules as part of fiber optic connector assemblies to establish fiber optic connections.

2. Technical Background

Benefits of utilizing optical fiber include extremely wide bandwidth and low noise operation. Because of these advantages, optical fiber is increasingly being used for a variety of applications, including but not limited to broadband voice, video, and data transmission in communications networks. As a result, communications networks include a number of optical interconnection points in fiber optic equipment and between fiber optic cables in which optical fibers must be interconnected via fiber optic connections. To conveniently provide these fiber optic connections, fiber optic connectors are provided. A fiber optic connector includes a housing that provides internal components for receiving, supporting, protecting, and aligning one or more end portions of optical fibers exposed from a fiber optic cable(s) when mated with other fiber optic connectors or adapters provided in fiber optic equipment or fiber optic cables. Fiber optic connectors may be installed on fiber optic cables in the field. Alternatively, fiber optic cables may be "pre-connectorized" during the manufacturing of the fiber optic cables.

To receive, support, and position an optical fiber in a fiber optic connector, a ferrule is typically provided in the fiber optic connector. A ferrule is a component that receives, supports, and positions an optical fiber(s) in a known location with respect to a housing of a fiber optic connector. Thus, when the housing of the fiber optic connector is mated with another fiber optic connector or adapter, the optical fiber(s) in the ferrule is positioned in a known, fixed location about the housing of the fiber optic connector. Thus, the optical fiber(s) are aligned with other optical fiber(s) provided in the mated fiber optic connector or adapter to establish an optical connection(s). In some fiber optic connectors, a "blind hole" ferrule is provided that includes an opening to receive an optical fiber and align the optical fiber with a lens disposed in the ferrule. In other fiber optic connectors, a "pass-through" ferrule is provided that includes a front opening and a rear opening on each end of a bore that allows an optical fiber to pass through the bore and through the front opening to extend past the front end face of the ferrule.

Whether a fiber optic connector includes a "blind hole" or "pass-through" ferrule, the end portion of the optical fiber may be polished during the connectorization process. Polishing the end portion of an optical fiber can reduce or eliminate scratches, cracks, or other blemishes that could otherwise cause optical attenuation. Polishing the end portion of the optical fiber prepares an optical surface on an end face of the optical fiber for low attenuation optical signal transfer. In fiber optic connectors employing "pass-through" ferrules, the height of the optical surface from the rear end face of the ferrule may also need to be precisely controlled as part of polishing to minimize an air gap between mated optical fibers and/or to meet fiber optic connector industry standards (e.g., consistent with International Standard CEI/IEC 61755-3-2).

Mechanical polishing processes can be employed, but are labor-intensive. For example, in a mechanical polishing process, optical fibers are manually routed through and secured within a ferrule such that an end portion of the optical fiber extends past a front end face of the ferrule at an initial height. The end portion of the optical fiber is then mechanically polished to create an optical surface at the desired height from the front end face of the ferrule. Mechanical polishing equipment can be expensive and not have the desired manufacturing throughput. For example, mechanical polishing equipment may include a fixture that is configured to support multiple ferrule assemblies for polishing as part of a batch process. At various stages of polishing, the ferrules and respective optical fibers may be removed, cleaned, and inspected. Also, this human involvement can lead to optical surface variations in mechanical polishing processes.

To minimize defects in prepared optical surfaces of optical fibers and improve manufacturing productivity, laser polishing may be employed. Laser polishing involves exposing the end portion of the optical fiber extending from the end face of a ferrule to a laser beam. This exposure can be controlled to create an optical surface in the end portion of the optical fiber. However, it may be difficult or not possible to control a laser beam envelope to create a desired optical surface in the end portion of the optical fiber at the desired height from the end face of the ferrule without also exposing the ferrule to the laser beam. Exposing the ferrule to the laser beam can damage the ferrule. Thus, if laser polishing processes are employed, so as to not expose the ferrule to the laser beam, the laser beam is controlled to create an optical surface in the end portion of the optical fiber at a larger distance from the end face of the ferrule. Then, a separate mechanical polishing process can be employed to reduce the height of the optical surface from the end face of the ferrule to create the desired height of the optical surface. Mechanical polishing of optical fibers involves human processing and associated labor costs. Mechanical polishing also introduces variances between prepared optical surfaces in ferrule assemblies.

SUMMARY OF THE DETAILED DESCRIPTION

Embodiments disclosed herein include simultaneous thermal forming of a ferrule and an optical fiber as part of a ferrule assembly to thermally form an optical surface in the ferrule assembly. Related fiber optic components, connectors, assemblies, and methods are also disclosed. In certain embodiments disclosed herein, the ferrule assembly is comprised of a ferrule and optical fiber. The ferrule has a ferrule bore. The optical fiber is disposed in the ferrule bore, wherein an end portion of the optical fiber extends from an end face of the ferrule. The ferrule may be made from a material or material composition that has the same or similar thermal energy absorption characteristics (e.g., melting and/or ablation) as the optical fiber disposed in the ferrule. Thus, when the end face of the ferrule and an end portion of an optical fiber extending from the end face of the ferrule are simultaneously exposed to one or more wavelengths of a laser beam emitted by a laser, at least a portion of the end face of the ferrule and end portion of the optical fiber are both thermally formed to form an optical surface at the end face of the ferrule. This is opposed to having to control the laser to only create an optical surface in the end portion of the optical fiber at greater distances from the end face of the ferrule to avoid exposing the ferrule to the laser beam to avoid damaging the ferrule. As a result, a separate mechanical polishing process may not be needed to finalize the creation of the optical surface in the ferrule assembly.

In this regard in one embodiment, a ferrule assembly for a fiber optic connector is provided. The ferrule assembly comprises a ferrule comprising a first end, a second end opposite the first end along an optical axis, a ferrule bore extending between a first opening of the first end and a second opening of the second end, and an end face disposed at the second end. At least a portion of the end face is absorptive to at least one wavelength. The ferrule assembly also comprises an optical fiber absorptive to the at least one wavelength. The optical fiber is disposed in the ferrule bore of the ferrule, wherein an end portion of the optical fiber extends from the end face of the ferrule. The ferrule assembly also comprises an optical surface. The optical surface is formed by thermally forming both at least a portion of the end face of the ferrule and the end portion of the optical fiber by simultaneously exposing the end face of the ferrule and the end portion of the optical fiber to a laser beam of the at least one wavelength emitted by a laser.

In another embodiment, a method of thermally forming an optical surface in an optical fiber extending from an end face of a ferrule is provided. The method comprises providing a ferrule having a first end, a second end opposite the first end along an optical axis, a ferrule bore extending between a first opening of the first end and a second opening of the second end, and an end face disposed at the second end. At least a portion of the end face is absorptive to at least one wavelength. The method also comprises disposing an optical fiber absorptive to the at least one wavelength through the ferrule bore and extending an end portion of the optical fiber through the end face of the ferrule. The method also comprises simultaneously exposing the end face of the ferrule and the end portion of the optical fiber to a laser beam of at least one wavelength emitted by a laser to thermally form at least a portion of the end face of the ferrule and the end portion of the optical fiber to thermally form an optical surface.

In another embodiment, an apparatus for thermally forming an optical surface of an optical fiber in a ferrule assembly is provided. The apparatus comprises a fixture. The fixture is configured to support a ferrule comprising a ferrule bore and an optical fiber disposed in the ferrule bore, wherein an end portion of the optical fiber extends from an end face of the ferrule, at least a portion of the end face of the ferrule and the optical fiber are both absorptive to at least one wavelength. The apparatus also comprises a laser. The laser is configured to emit a laser beam having the at least one wavelength to simultaneously expose the end face of the ferrule and the end portion of the optical fiber to the laser beam to thermally form an optical surface in at least a portion of the end face of the ferrule and the end portion of the optical fiber.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include simultaneous thermal forming of a ferrule and an optical fiber as part of a ferrule assembly to thermally form an optical surface in the ferrule assembly. Related fiber optic components, connectors, assemblies, and methods are also disclosed. In certain embodiments disclosed herein, the ferrule assembly is comprised of a ferrule and optical fiber. The ferrule has a ferrule bore. The optical fiber is disposed in the ferrule bore, wherein an end portion of the optical fiber extends from an end face of the ferrule. The ferrule may be made from a material or material composition that has the same or similar thermal energy absorption characteristics (e.g., melting and/or ablation) as the optical fiber disposed in the ferrule. Thus, when the end face of the ferrule and an end portion of an optical fiber extending from the end face of the ferrule are simultaneously exposed to one or more wavelengths of a laser beam emitted by a laser, at least a portion of the end face of the ferrule and end portion of the optical fiber are both thermally formed to form an optical surface at the end face of the ferrule. This is opposed to having to control the laser to only create an optical surface in the end portion of the optical fiber at greater distances from the end face of the ferrule to avoid exposing the ferrule to the laser beam to avoid damaging the ferrule. As a result, a separate mechanical polishing process may not be needed to finalize the creation of the optical surface in the ferrule assembly.

Figure 1A:
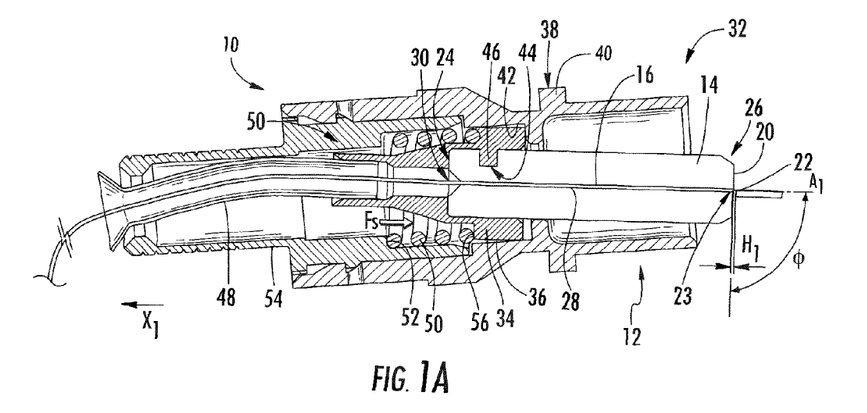
FIG. 1A is a side cross-sectional view of an exemplary fiber optic connector sub-assembly that includes a ferrule assembly having an exemplary ferrule and an optical fiber having the same or similar thermal energy absorption characteristics for at least one wavelength.
Figure 1B:
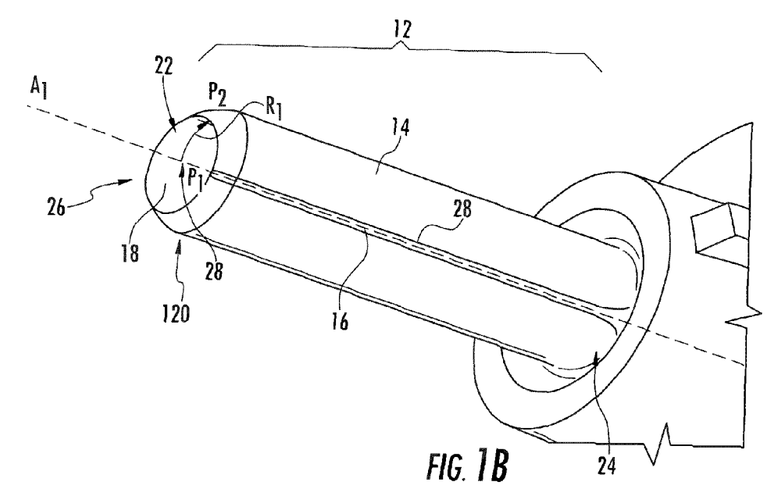
FIG. 1B is a close-up, perspective view of an exemplary ferrule having the same or similar thermal energy absorption characteristics as an optical fiber for at least one wavelength, wherein the ferrule end face and the optical fiber end portion were simultaneously exposed to a laser beam to thermally form at least a portion of the ferrule end face and the optical fiber end portion into an optical surface in the ferrule assembly.

In this regard, FIG. 1A is a side cross-sectional view of an exemplary fiber optic connector sub-assembly 10. The fiber optic connector sub-assembly 10 includes a ferrule assembly 12 having an exemplary ferrule 14 and optical fiber 16 having the same or similar thermal energy absorption characteristics for at least one wavelength. FIG. 1B is a close-up, perspective view of the ferrule assembly 12 in FIG. 1A after an optical surface 18 has been thermally formed in the ferrule 14. The optical surface 18 is formed in the ferrule 14, as illustrated in FIG. 1B, to facilitate optical transfer with another optical fiber in another fiber optic connector. As will be described in more detail below, at least an end face 20 of the ferrule 14 and an end portion 22 of the optical fiber 16 were simultaneously exposed to a laser beam to thermally form the end face 20 of the ferrule 14 and the end portion 22 of the optical fiber 16 into the optical surface 18. The end face 20 of the ferrule 14 and an end portion 22 of the optical fiber 16 are thermally formed simultaneously and together to form the optical surface 18. By simultaneously, it is meant that the end face 20 of the ferrule 14 and an end portion 22 of the optical fiber 16 are both exposed to a laser beam together, not that only either end face 20 of the ferrule 14 or the end portion 22 of the optical fiber 16 being exposed to the laser beam. Because the ferrule 14 includes a material having the same or similar thermal energy absorption characteristics for at least one wavelength as the optical fiber 16 in this example, the end face 20 of the ferrule 14 and end portion 22 of the optical fiber 16 can be thermally formed together into a substantially planar end optical surface 18.

The thermal forming discussed herein can also be performed in one laser processing step, if desired, that is geometrically compliant with desired design parameters or standards. The thermal forming process can cut the end portion 22 of the optical fiber 16 and polish the optical surface 18 thermally formed as a result of thermally forming both the end face 20 of the ferrule 14 and the end portion 22 of the optical fiber 16 simultaneously. This is opposed to having to control a laser to only create an optical surface in the end portion of an optical fiber at greater distances from an end face of a ferrule to avoid exposing the ferrule to the laser beam to avoid damaging the ferrule. Mechanical steps, including polishing the end portion 22 of the optical fiber 16 through a mechanical grinding process can result in process variations, increased labor time, and defect and scrap, may be avoided.

As will also be discussed in more detail below, only a portion of the end face 20 of the ferrule 14 need be manufactured from a material that has the same or similar thermal energy absorption characteristics of the optical fiber 16. The portion of the end face 20 of the ferrule 14 proximate to the second opening 23 where the end portion 22 of the optical fiber 16 extends from, should be manufactured from a material that has the same or similar thermal energy absorption characteristics of the optical fiber 16 to thermally form the optical surface 18 as discussed herein. The entire ferrule 14 could also be manufactured from a material that has the same or similar thermal energy absorption characteristics of the optical fiber 16.

Before discussing examples of materials and compositions of the ferrule 14 and the optical fiber 16 to allow for the end face 20 of the ferrule 14 and end portion 22 of the optical fiber 16 to be thermally formed into the optical surface 18 by a laser, more detail regarding the exemplary fiber optic connector sub-assembly 10 is first described below. In this regard as illustrated in FIG. 1A, the ferrule 14 laterally and angularly aligns the end portion 22 of the optical fiber 16 at the end face 20 of the ferrule 14. The ferrule 14 includes a first end 24, a second end 26, and a ferrule bore 28 (also known as a "microbore") extending between the first end 24 and the second end 26. The optical fiber 16 is disposed through the ferrule bore 28 that extends along the center optical axis $A_1$ of the ferrule 14. A first opening 30 is disposed at the first end 24 of the ferrule 14. The first opening 30 provides a passageway by which the end portion 22 of the optical fiber 16 enters the ferrule bore 28 of the ferrule 14. The first opening 30 may be cone-shaped to provide easy entry of the optical fiber 16 into the ferrule bore 28. The end portion 22 of the optical fiber 16 exits the ferrule bore 28 and extends past the end face 20 through the second opening 23 in the second end 26 of the ferrule 14 to an initial height $H_1$ before thermal forming. The optical fiber 16 may be secured within the ferrule bore 28 with a bonding agent. The bonding agent may prevent movement of the optical fiber 16 within the ferrule bore 28 to minimize signal attenuation between the optical fiber 16 and the complementary receptacle (not shown), which may include an opposing optical fiber. Movement of the optical fiber 16 within the ferrule bore 28 may be undesirable because the movement may cause attenuation.

With continuing reference to FIG. 1A, the ferrule 14 may be disposed at a front end 32 of the fiber optic connector sub-assembly 10. The first end 24 of the ferrule 14 may be at least partially disposed within a ferrule holder body 34. The ferrule holder body 34 supports the ferrule 14 within the fiber optic connector sub-assembly 10. The ferrule holder body 34 may support the end face 20 of the ferrule 14 to be disposed orthogonal to the optical axis $A_1$ or angled at angle φ (phi) with respect to the optical axis $A_1$. For example, the angle φ (phi) may be within ten (10) degrees of orthogonal with respect to the optical axis $A_1$, as depicted in FIG. 1A. The angle φ (phi) may be angled to be non-orthogonal to increase the contact area between the optical fiber 16 and another optical fiber of the complementary receptacle (not shown).

With continuing reference to FIG. 1A, the ferrule holder body 34 may include a body alignment surface 36 which may be disposed to allow easy insertion of the ferrule holder body 34 within a housing 38 of the fiber optic connector sub-assembly 10. The housing 38 in this embodiment includes an inner housing 40 including a housing alignment surface 42. The second end 26 of the ferrule 14 may be at least partially disposed within the inner housing 40. In this regard, the ferrule 14 may be protected from random perturbation forces ("side loads") orthogonal to the optical axis $A_1$ when unmated to the complementary receptacle (not shown). It is noted that the ferrule holder body 34 may also be used in other fiber optic connectors including a spring-loaded ferrule holder body 34 without the inner housing 40, for example, non-SC type fiber optic connectors. In these other fiber optic connectors, the housing may be an enclosure (not shown) around the ferrule holder body 34. The ferrule 14 may also include a ferrule notch 44. The ferrule notch 44 may be filled with a portion 46 of the ferrule holder body 34 to prevent the ferrule 14 from disengaging from the ferrule holder body 34. The ferrule holder body 34 may comprise molded plastic as a non-limiting example.

With continuing reference to FIG. 1A, the fiber optic connector sub-assembly 10 may also include a lead-in tube 48 engaged to a rear end 50 of the ferrule holder body 34 to facilitate alignment of the optical fiber 16. The lead-in tube 48 generally restricts a location of a bonding agent used during installation of the optical fiber 16 and prevents the bonding agent from escaping. Otherwise, the bonding agent may come into contact with other areas of the fiber optic connector sub-assembly 10, such as a spring (discussed below), which must be free to move unfettered by the bonding agent. The lead-in tube 48 also facilitates guiding the end portion 22 of the optical fiber 16 into the ferrule holder body 34, where the optical fiber 16 can then be guided to the ferrule 14. The lead-in tube 48 may also prevent sharp bends from occurring in the optical fiber 16 during insertion that could damage the optical fiber 16 as the end portion 22 of the optical fiber 16 is disposed in the ferrule holder body 34 and into the ferrule 14.

The lead-in tube 48 may be made of a flexible and resilient material with high surface lubricity, for example, polyethylene, silicone, or thermoplastic elastomer. This material may also include additives, for example, mineral fill or silica-based lubricant or graphite. In this manner, the optical fiber 16 may smoothly travel the lead-in tube 48 without being caught during insertion. The material may be a type of material that would not be degraded by a bonding agent, such as an epoxy or other chemical agent in standardized testing (e.g., Telcordia GR-326-CORE) and would not allow bonding by a bonding agent.

With continuing reference to FIG. 1A, a spring 50 may be disposed between a spring seat base 52 of a crimp body 54 attached to the inner housing 40 and a spring seating surface 56 of the ferrule holder body 34. The spring 50 in this example is biased to apply a spring force $F_S$ to the spring seating surface 56 to push the ferrule holder body 34 and thereby push the end face 20 of the ferrule 14 against a complementary receptacle. When contact is made between the end face 20 of the ferrule 14 and a complementary receptacle, the ferrule holder body 34 translates in the rear direction $X_1$, and the force $F_S$ will press the end face 20 against a complementary receptacle to minimize attenuation. A bonding agent 28, which may be used during the installation of the optical fiber 16, should not come into contact with the spring 50. Otherwise, the bonding agent would prevent movement of the spring 50. The lead-in tube 48 may generally restrict a bonding agent to an area within the ferrule holder body 34, and prevent a bonding agent from reaching the spring 50.

The optical surface 18 in the ferrule 14, as illustrated in FIG. 1B, is formed as a result of simultaneously thermally forming the end face 20 of the ferrule 14 and the end portion 22 of the optical fiber 16. It may be desired to form the optical surface 18 planar or substantially planar to the end face 20 of the ferrule 14 rather than at a height distance away, such as height $H_1$, as illustrated in FIG. 1A. The ferrule 14 is constructed from a material or material composition having the same or similar thermal energy absorption characteristics for at least one wavelength as the optical fiber 16, so that the end face 20 of the ferrule 14 and the end portion 22 of the optical fiber 16 can both be thermally formed together simultaneously into the optical surface 18 by exposure to wavelength energy containing the at least one wavelength.

With reference back to FIG. 1B, because the ferrule 14 includes a material having the same or similar thermal energy absorption characteristics for at least one wavelength as the optical fiber 16 in this example, the end face 20 of the ferrule 14 and end portion 22 of the optical fiber 16 can be thermally formed together into a planar or substantially planar end optical surface 18 in one laser processing step that is geometrically compliant with desired design parameters or standards. In this regard, the optical surface 18 may be planar between points $P_1$ and $P_2$ on the thermally formed optical surface 18, meaning points $P_1$ and $P_2$ are disposed in the same plane orthogonal to the optical axis $A_1$ of the ferrule 14. In another embodiment, the optical surface 18 may be thermally formed having a radius of curvature between approximately 1 millimeter (mm) and 30 mm between point $P_1$ and point $P_2$, and may further be from about five (5) mm to twenty-five (25) mm. In another embodiment, the optical surface 18 may be thermally formed below the surface of the end face 20 of the ferrule 14 in FIG. 1A proximate the ferrule bore 28. This is possible, because as discussed in more detail below by example, the ferrule 14 may be manufactured to provide a gradiated composite material, wherein an inner portion(s) of the ferrule 14 proximate the ferrule bore 28 may have the same or similar thermal characteristics as the optical fiber 16, whereas outer portion(s) of the ferrule 14 may be less absorptive than the optical fiber 16.

Figure 2:
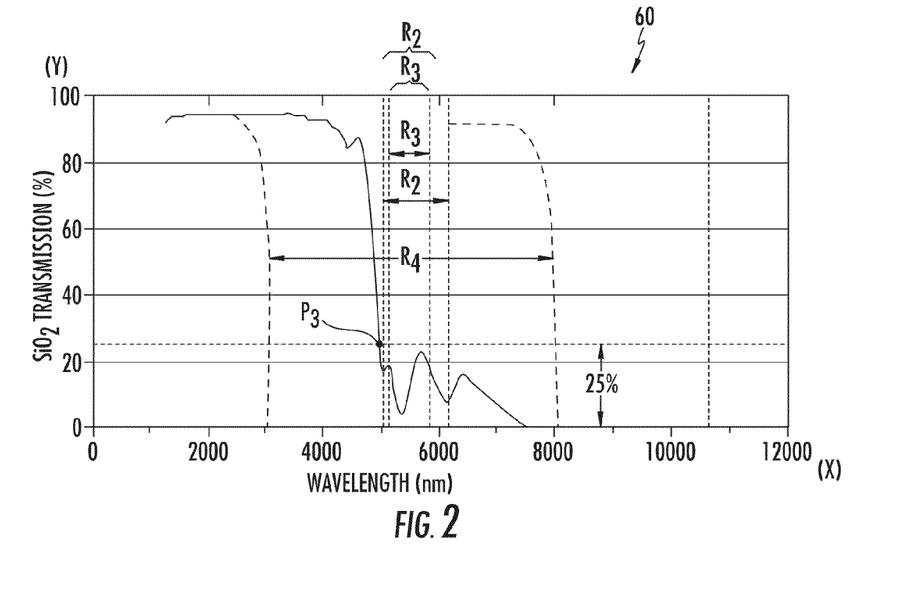
FIG. 2 is a chart of a percent absorption of a laser beam through a one-hundred micron thick sample of silica (i.e., silicon dioxide ($SiO_2$)) versus a wavelength of a laser beam.

As a non-limiting example, the optical fiber 16 may be formed from silica. In this example, only wavelength energy that is absorbed by a silica optical fiber 16 is available to enable the thermal forming to create the optical surface 18. To further illustrate by example, FIG. 2 is a chart 60 of a percentage transmission of wavelength energy through a one-hundred (100) micrometer (μm) thick sample of silica (i.e., silicon dioxide ($SiO_2$)) versus wavelength energy, such as energy in a laser beam emitted by a laser. The wavelength ranges in nanometers (nm) are provided on the X-axis labeled "WAVELENGTH." The transmission percentage of energy at a given wavelength that transmits through the silica sample is provided on the Y-axis as "SiO$_2$ TRANSMISSION (%)." Wavelength energy that is not transmitted through the silica sample is absorbed or reflected. Empirical data indicates that within the wavelength range R$_2$ (5,000 nm-6,200 nm) more than ninety (90) percent of wavelength energy is absorbed by the silica sample and available for thermal forming. Thus, a laser emitting a laser beam in the wavelength range of R$_2$ would be able to be used to thermally form a silica optical fiber 16. If the ferrule 14 were also manufactured from silica, both the silica ferrule 14 and the optical fiber 16 would have the same wavelength energy absorption characteristics, and would both thermally form when exposed to a laser beam having a wavelength in the wavelength range of R$_2$.

With continuing reference to the chart 60 in FIG. 2, data point P$_3$ can be defined where, at a wavelength of five thousand (5,000) nm, twenty-five percent (25%) of the wavelength energy may be transmitted through the silica example. Wavelengths shorter than five thousand (5,000) nm may exhibit a significantly higher transmission rate through the silica sample as wavelength energy passes through the one-silica sample and is not available to heat and thermally form the material. Empirical evidence shows in this case a carbon dioxide laser or carbon-monoxide laser, emitting a laser beam including wavelengths within the range R$_3$, (approximately 5200 to 5800 nm), would efficiently provide power to enable thermal forming to occur for a ferrule 14 and optical fiber 16 comprising silica.

Other materials may also be used for the ferrule 14 and optical fiber 16 and be absorptive or substantially absorptive of wavelength energy. For example, a silica material may be doped with hydroxide or a hydroxide composite and provided in the ferrule 14 and optical fiber 16 to expand the range of absorption of wavelength energy. For example, the absorption range may be expanded between three thousand (3,000) nm and eight thousand (8,000) nm, as shown by the wavelength range R$_4$. In this example, a laser configured to emit a laser beam at a wavelength or wavelength range contained in the wavelength range R$_4$ could provide power to enable thermal forming of the end face 20 of the ferrule 14 and the end portion 22 of the optical fiber 16 to thermally form the optical surface 18.

Other materials besides silica that have the same or similar thermal energy absorption characteristics may be used to manufacture the ferrule 14. For example, the ferrule 14 may be manufactured from a borosilicate material or composite for an optical fiber 16 manufactured from a silica or silica composite. As another example, the ferrule 14 may be manufactured from a ceramic glass material or composite for an optical fiber 16 manufactured from a silica or silica composite. As a non-limiting example, the ferrule 14 may be manufactured from a material having a lower coefficient of thermal expansion than zirconia.

The ferrule 14 may not be manufactured from a purely zirconium oxide (ZrO$_2$) material if the optical fiber 16 is manufactured from silica. Zirconium oxide does not have similar enough thermal energy absorption characteristics to silica to allow the end face 20 of the ferrule 14 to be thermally formed with the end portion 22 of a silica optical fiber 16 to thermally form the optical surface 18. For example, for a half-millimeter thick sample of zirconium dioxide, sixty-five (65) percent of wavelength energy may be transmitted through the zirconium dioxide sample at wavelength energy of six thousand, two hundred (6,200) nm.

Figure 3:
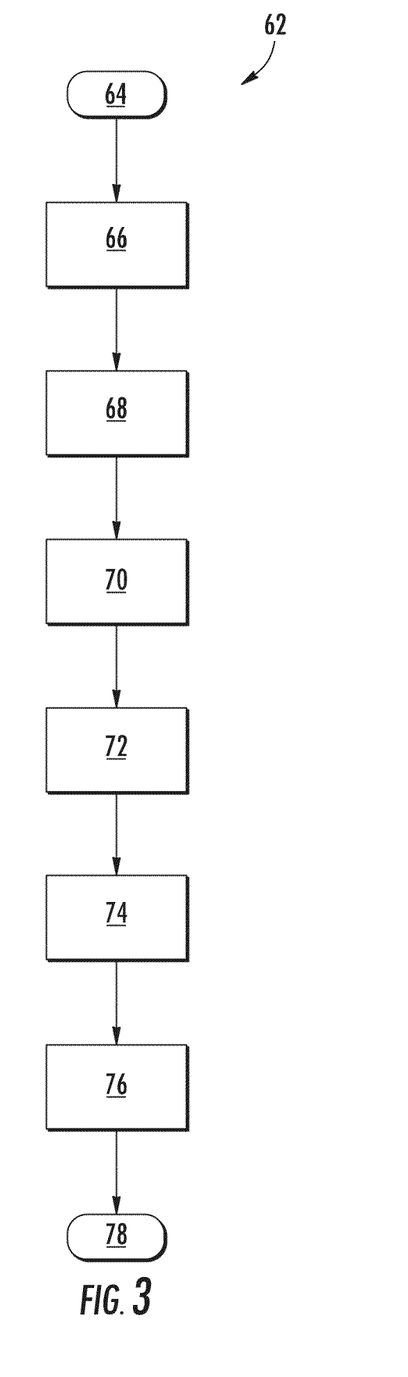
FIG. 3 is a flowchart diagram of an exemplary process of simultaneously exposing the ferrule end face and the optical fiber end portion in the ferrule assembly in FIG. 1 to a laser beam having at least one wavelength to thermally form at least a portion of the ferrule end face and the optical fiber end portion into an optical surface in the ferrule assembly, wherein the ferrule and optical fiber have the same or similar thermal energy absorption characteristics for the at least one wavelength.

A thermally forming process can be employed using wavelength energy from a laser to simultaneously thermally form the end face 20 of the ferrule 14 and the end portion 22 of the optical fiber 16 into the optical surface 18. In this regard, FIG. 3 is a flowchart diagram of an exemplary process 62 of simultaneously exposing the end face 20 of the ferrule 14 and the end portion 22 of the optical fiber 16 to a laser beam emitting a wavelength or wavelength range to thermally form at least a portion of the end face 20 of the ferrule 14 and the end portion 22 of the optical fiber 16 into the optical surface 18. The laser is provided such that the wavelength or wavelength range of the laser beam emitted by the laser is absorptive to the ferrule 14 and the optical fiber 16, which have the same or similar thermal energy absorption characteristics at the wavelength or wavelength range of the laser beam. The exemplary process in FIG. 3 will be described in conjunction with FIGS. 4A and 4B, which illustrate an exemplary laser processing apparatus 80 that includes a laser 82 for emitting a laser beam 84 at a wavelength or wavelength range to thermally form the optical surface 18.

In this regard, the process 62 starts (block 64 in FIG. 3). For discussion purposes, it is assumed that the process 62 is employed to thermally form the optical surface 18 in the ferrule 14 in the ferrule assembly 12 in FIG. 1. However, note that the process 62 is not limited to thermally forming an optical surface in the ferrule assembly 12. With continuing reference to FIG. 3, the ferrule 14 is provided (block 66). As previously discussed in FIG. 1A, the ferrule 14 has the first end 24 and the second end 26 opposite the first end 24 along optical axis A1. A ferrule bore 28 extends in the ferrule 14 between a first opening 30 of the first end 24 and a second opening 23 of the second end 26. The end face 20 is disposed at the second end 26 of the ferrule 14. At least a portion of the end face 20 is absorptive to the wavelength or wavelength range of the laser beam 84 emitted by the laser 82 in FIG. 4A. The ferrule 14 may be provided of any material, including the materials described above, as long as the ferrule 14 is absorptive of the wavelength or wavelength range of the laser beam 84 emitted by the laser 82 in FIG. 4A.

With continuing reference to FIG. 3, the optical fiber 16 is provided. The optical fiber 16 is provided that is absorptive to the wavelength energy of the laser beam 84 emitted by the laser 82 in FIG. 4A (block 68). Thus, both the ferrule 14 and the optical fiber 16 are manufactured from a material that has the same or similar thermal energy absorption characteristics to wavelength energy, which in this example is the wavelength or wavelength range of the laser beam 84 emitted by the laser 82 in FIG. 4A. The end portion 22 of the optical fiber 16 is disposed through the ferrule bore 28 of the ferrule 14 until the end portion 22 of the optical fiber 16 is extended through the second opening 23 and through the end face 20 of the ferrule 14 to height H$_1$, as illustrated in FIG. 4B (block 70 in FIG. 3). For example, the end portion 22 of the optical fiber 16 may be extended at least five-hundred (500) nm past the end face 20 of the ferrule 14 (block 70).

Figure 4A:
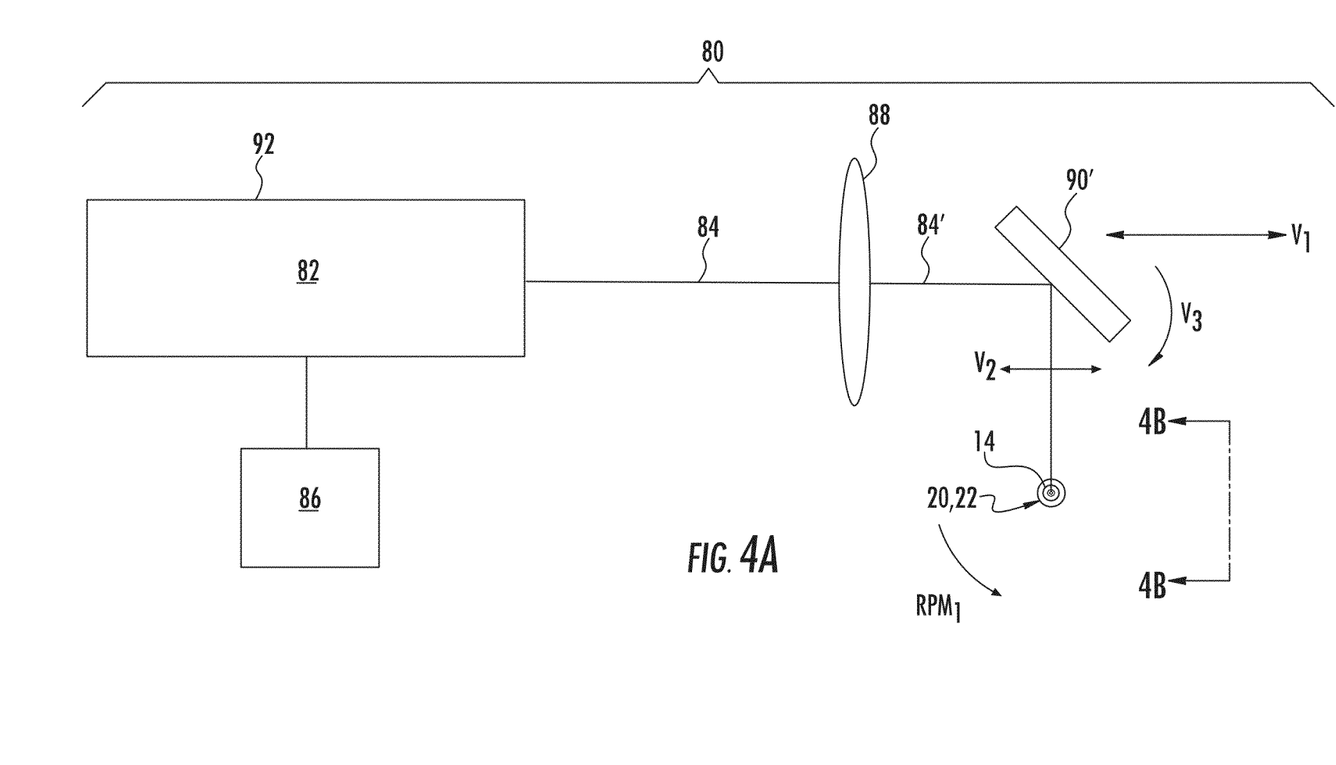
FIG. 4A is a top view of one embodiment of an exemplary laser processing apparatus including a laser configured to emit a laser beam having at least one wavelength to simultaneously expose the ferrule end face and the optical fiber end portion of the ferrule assembly in FIG. 1A to the laser beam to thermally form at least a portion of the ferrule end face and the optical fiber end portion into an optical surface in the ferrule assembly in FIG. 1B.
Figure 4B:
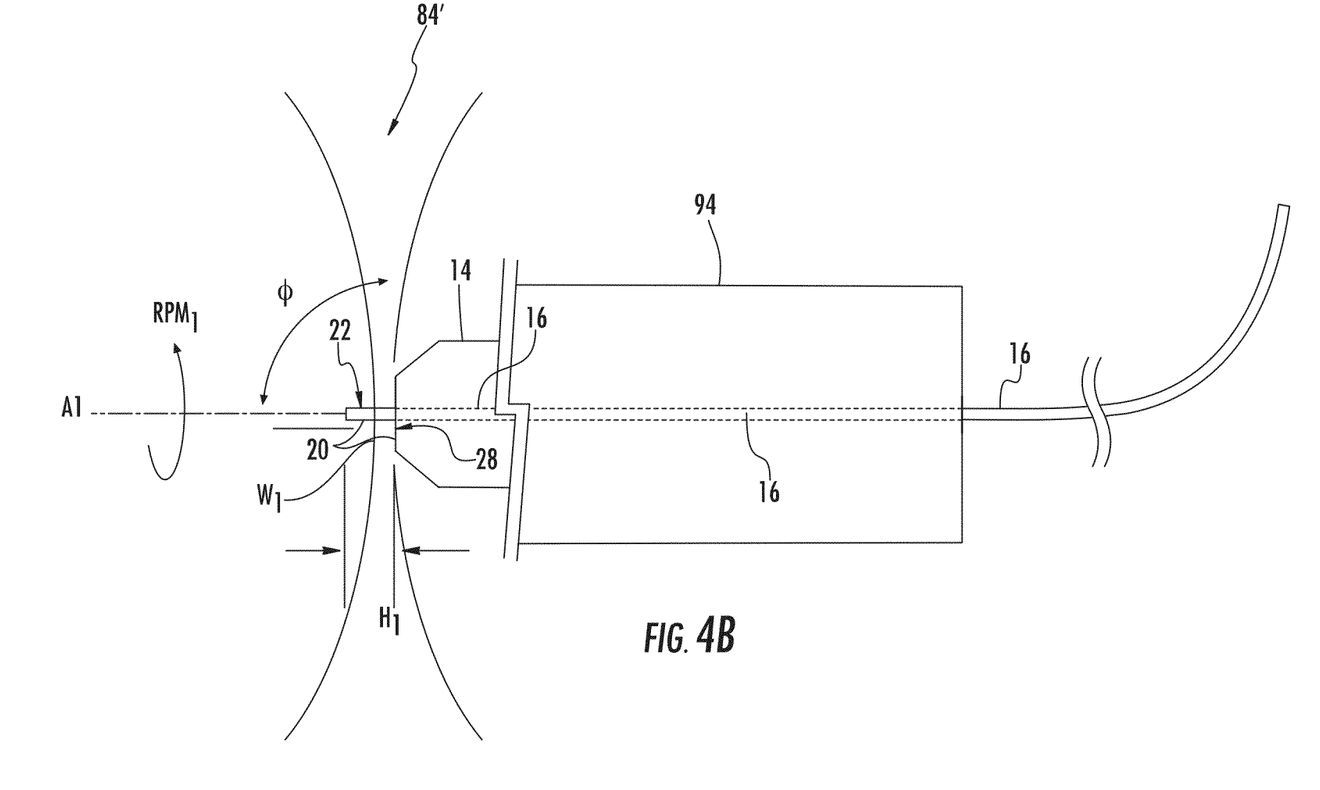
FIG. 4B is a close-up side view of providing a ferrule and optical fiber disposed therein as part of a ferrule assembly in FIG. 1A exposed to a laser beam of a laser to thermally form at least a portion of the ferrule end face and the optical fiber end portion into an optical surface in the ferrule assembly.

With continuing reference to FIG. 3, the process 62 includes emitting the laser beam 84 from the laser 82 in FIG. 4A (block 72 in FIG. 3). The laser processing apparatus 80 in FIG. 4A is configured to simultaneously expose the end face 20 of the ferrule 14 and the end portion 22 of the optical fiber 16 to the laser beam 84 at the wavelength or wavelength range of the laser beam 84. Simultaneously exposing the end face 20 of the ferrule 14 and the end portion 22 of the optical fiber 16 to thermally form at least a portion of the end face 20 of the ferrule 14 and the end portion 22 of the optical fiber 16 to thermally form the optical surface 18. As illustrated in FIG. 4B, the laser beam 84 may be directed to be incident to the end portion 22 of the optical fiber 16 and within the geometric plane P$_4$ intersecting the optical axis A$_1$ of the end portion 22 of the optical fiber 16. The laser beam 84 may be emitted within the geometric plane $P_4$ orthogonal or substantially orthogonal to the optical axis $A_1$ of the optical fiber 16.

As discussed above, the laser beam 84 may be emitted from the carbon-monoxide or carbon-dioxide laser such as laser 82 in FIG. 4A, as non-limiting examples. As a further non-limiting example, the wavelength range of the laser beam 84 may be provided between 3,000 nm to 8,000 nm if the ferrule 14 and optical fiber 16 are manufactured from material or material composition being absorptive of wavelength energy at such wavelengths. As an example, the wavelength range of the laser beam 84 may be provided between 5,200 nm to 5,800 nm. As another non-limiting example, the optical fiber 16 and the ferrule 14 could be configured to absorb at least twenty-five (25) percent of the energy of the wavelength or wavelength range of the laser beam 84.

With continuing reference to FIG. 3, the process 62 may include exposing the end portion 22 of the optical fiber 16 to the laser beam 84 for a period of time sufficient to form the optical surface 18 (block 74 in FIG. 3). The period of time may be less than ten (10) seconds as a non-limiting example. The period of time may be chosen to be sufficient to allow at least a portion of the end face 20 of the ferrule 14 and the end portion 22 of the optical fiber 16 to become reflow material. The process 62 may further include removing the end face 20 of the ferrule 14 and the end portion 22 of the optical fiber 16 from exposure to the laser beam 84 to allow the reflow material of the portion of the end face 20 of the ferrule 14 and the end portion 22 of the optical fiber 16 to cool into the optical surface 18 (block 76 in FIG. 3). The processes in blocks 74 and 76 may be repeated until the desired optical surface 18 is thermally formed, until the process 62 is desired to end (block 78 in FIG. 3).

More detail regarding the exemplary laser processing apparatus 80 in FIG. 4A will now be described. FIG. 4A is a top view of the laser 82 configured to emit the laser beam 84 having a wavelength or wavelength range. The laser 82 is controlled by controller 86 to emit the laser beam 84 to simultaneously expose the end face 20 of the ferrule 14 and the end portion 22 of the optical fiber 16 to thermally form at least a portion of the ferrule end face and the optical fiber end portion to thermally form the optical surface 18. The laser processing apparatus 80 in this example includes the laser 82, at least one focusing lens 88, and at least one steering mirror 90. The laser 82 is supported by a fixture 92. The ferrule 14 is supported by fixture 94.

With continuing reference to FIG. 4A, the laser 82 emits the laser beam 84 in a wavelength or wavelength range that is absorptive to the ferrule 14 and the optical fiber 16 towards the end face 20 of the ferrule 14 and the end portion 22 of the optical fiber 16. The optical fiber 16 may extend from the end face 20 of the ferrule 14. The laser 82 can be modified or chosen to purposefully emit the laser beam 84 at one or more wavelengths that are absorptive or substantially absorptive to the material composition of the ferrule 14 and optical fiber 16, as previously discussed above. It is noted that a carbon-monoxide laser may be able to provide the increased power to create the optical surface 18.

With continuing reference to FIGS. 4A and 4B, the focusing lens 88 focuses the laser beam 84 to a smaller focused laser beam 84' of width $W_1$ to concentrate the wavelength energy of the laser beam 84 to be efficiently directed to the end face 20 of the ferrule 14 and the end portion 22 of the optical fiber 16. Providing the laser beam 84 into laser beam 84' having a concentrated width may accelerate the melting or ablation of the end face 20 of the ferrule 14 and the end portion 22 of the optical fiber 16. The focusing lens 88 may be made of a high-grade optical material, such as calcium fluoride (CaF) or zinc selenide (ZnSe) as non-limiting examples. For purposes of comparison, an exemplary width or diameter of the optical fiber 16 may be one-hundred twenty-five (125) μm. The laser beam 84 with a wavelength in the range of $R_2$ in FIG. 2 may be 5,500 nm and may be focused by the focusing lens 88 to an exemplary width of 5.5 μm.

With continuing reference to FIG. 4A, the steering mirror 90 steers or direct the emitted laser beam 84 towards the end face 20 of the ferrule 14 and the end portion 22 of the optical fiber 16 extending from the end face 20, as illustrated in FIG. 4B. The steering mirror 90 may be a one-dimensional (1-D) scanner, which translates back and forth along a velocity vector $V_1$, thereby causing the laser beam 84 to translate back and forth along a velocity vector $V_2$. The velocity vectors $V_1$, $V_2$ may be the same so there is no angular movement of the steering mirror 90. The steering mirror 90 may translate the laser beam 84 within a geometric plane $P_4$ intersecting the optical axis $A_1$ of the end portion 22 of the optical fiber 16. In this manner, as shown in FIGS. 4A and 4B, the laser beam 84' may be translated back and forth with velocity $V_2$ across the width or the diameter of the end face 20 of the ferrule 14 and the end portion 22 of the optical fiber 16 to transfer wavelength energy to thermally form the optical surface 18.

Alternatively, the steering mirror 90 may be a galvanometer one dimensional (1-D) scanner that angularly moves back and forth at a velocity $V_3$. The steering mirror 90 may steer or direct the emitted laser beam 84' towards the end face 20 of the ferrule 14 and the end portion 22 of the optical fiber 16 extending from the end face 20. The steering mirror 90 may angularly direct the laser beam 84' within the geometric plane $P_4$ intersecting the optical axis $A_1$ of the end portion of the optical fiber 16. In this manner, the laser beam 84' may be angularly directed back and forth with a velocity $V_3$ across the width or the diameter of the optical fiber 16 to transfer energy along the width or the diameter of the optical fiber 16 to create the optical surface 18.

The optical surface 18 may be created by thermal forming involving a conversion of solids to liquids and gases encompassing melting and/or ablation. Melting involves transforming a solid phase of a material into a liquid or liquid phase. Ablation involves transforming a solid phase of a material into a gas or gaseous phase. Both melting and ablation can occur during thermal forming. The transfer of energy from the laser beam 84' thermally forms the optical surface 18, where material of the end face 20 of the ferrule 14 and the end portion 22 of the optical fiber 16 may melt and reflow before cooling to form the optical surface 18. A surface tension of the melted material during reflow and cooling forms a planar-shaped or substantially planar-shaped optical surface 18 free or relatively free of optical defects. The resulting optical surface 18 created by thermal forming may have fewer optical imperfections than if polished.

With continued reference to FIGS. 4A and 4B, the geometric plane $P_4$ of the movement of the laser beam 84 may be parallel to the end face 20 of the ferrule 14 at the second opening 26 to create an optical surface 18 parallel to the end face 20. The geometric plane $P_4$ may be angled at an angle $\theta_1$ relative to the optical axis $A_1$ and as discussed earlier, the end face 20 may be angled at the angle $\phi$ relative to the optical axis $A_1$. The angle $\phi$ and the angle $\theta$ may be equal and may be orthogonal to the optical axis $A_1$. Efficient creation of the optical surface 18 may occur when the $\theta$ (theta) angle is orthogonal to the optical axis $A_1$ to minimize reflections.

With continued reference to component details of the laser processing apparatus 80 of FIGS. 4A and 4B, the steering mirror 90 and the fixture 92 are now discussed in detail. The steering mirror 90 may steer the laser beam 84 from the laser 82 and/or focusing lens 88 to the ferrule 14 and/or end portion 22 of the optical fiber 16. The steering mirror 90 may be made, for example, of a highly reflective material for the laser beam 84 having the desired wavelength range. The steering mirror 90 may be comprised of, for example, an aluminum material or a silicon carbide material.

The fixture 94 may be configured to support the ferrule 14 having the optical fiber 16 disposed therein and the end portion 22 of the optical fiber 16 extending through the end face 20 of the ferrule 14. The fixture 94 may engage and thereby prevent axial and/or angular movement of the ferrule holder body 34 and/or ferrule 14 relative to the fixture 94. Thus, the position of the end face 20 of the ferrule 14, the second opening 23 in the end face 20, and/or the end portion 22 of the optical fiber 16 may be known during the thermal forming of the optical surface 18. Accurate positioning of the optical surface 18 may be achieved when these positions are known during manufacturing.

It is noted that the fixture 94 may be rotated with a rotational velocity of $RPM_1$ about the optical axis $A_1$ to more uniformly distribute the laser energy along a circumference of the end portion 22 of the optical fiber 16. The fixture 94 may be rotated with a motor (not shown), which may be, for example, electrically powered. In this manner, the optical surface 18 may be thermally formed in a shape that is more uniform and planar or substantially planar.

Figure 5:
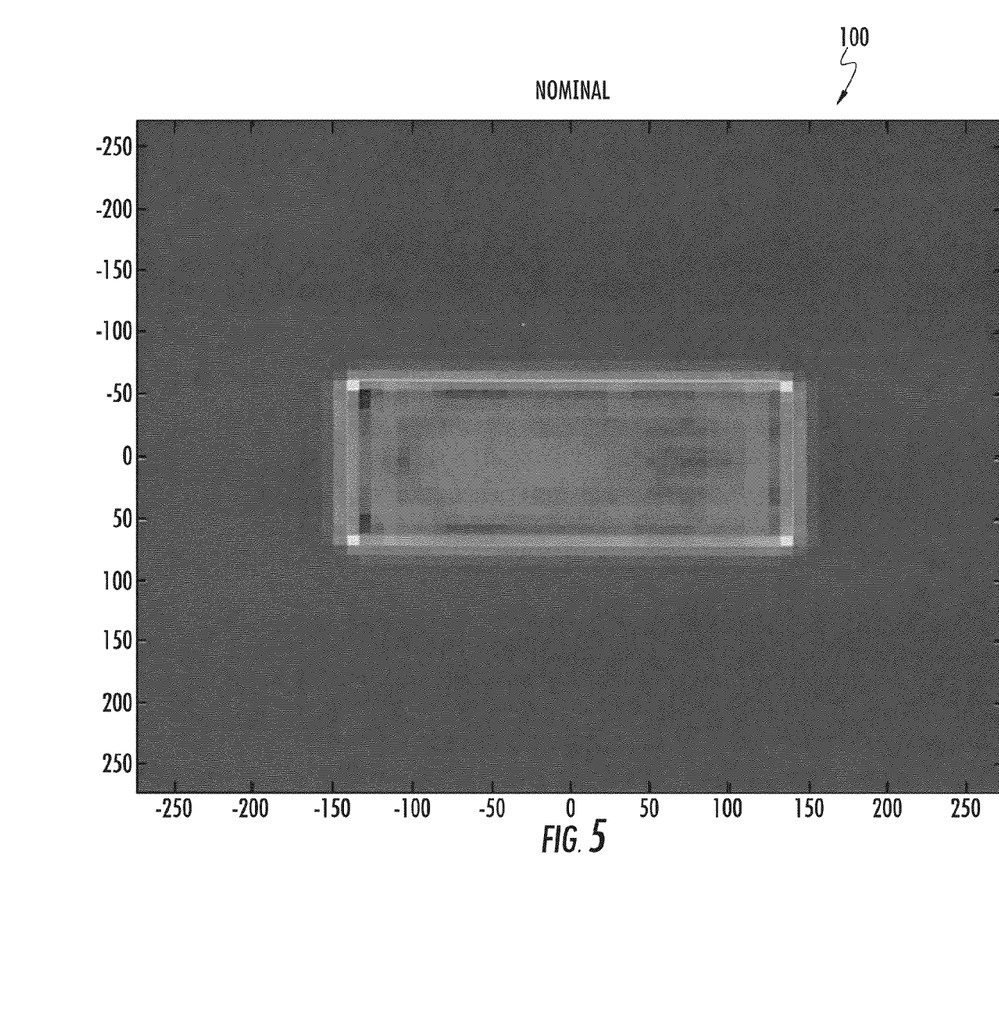
FIG. 5 is an exemplary cross-sectional energy distribution of an exemplary diffractive optic that can be employed in the laser processing apparatus of FIGS. 4A and 4B to control the energy distribution of the laser beam to thermally form an optical surface in the ferrule assembly of FIG. 1.

As an alternative to sweeping the laser beam 84 in the laser processing apparatus 80 in FIGS. 4A and 4B, the energy distribution of the laser beam 84 may be shaped by a diffractive optic in place of the focusing lens 88 and steering mirror 90. The diffractive optic can control the energy distribution of the laser beam 84 to thermally form the optical surface 18 in the ferrule assembly 12 in FIG. 1B. In this regard, FIG. 5 is an exemplary cross-sectional energy distribution 100 of an exemplary diffractive optic that can be employed in the laser processing apparatus 80 of FIGS. 4A and 4B. The energy distribution of the diffractive optic is 150 μm by 300 μm. As a non-limiting example, a diffractive optic can be manufactured from zirconia selenium (ZnSe). The controller 86 can control the laser 82 to emit and not emit the laser beam 84 on and off without needing to translate the laser beam 84 or the ferrule 14. The laser 82 and the diffractive optic can be sized to match the desired energy distribution to thermally form and polish the optical surface 18.

Figure 6A:
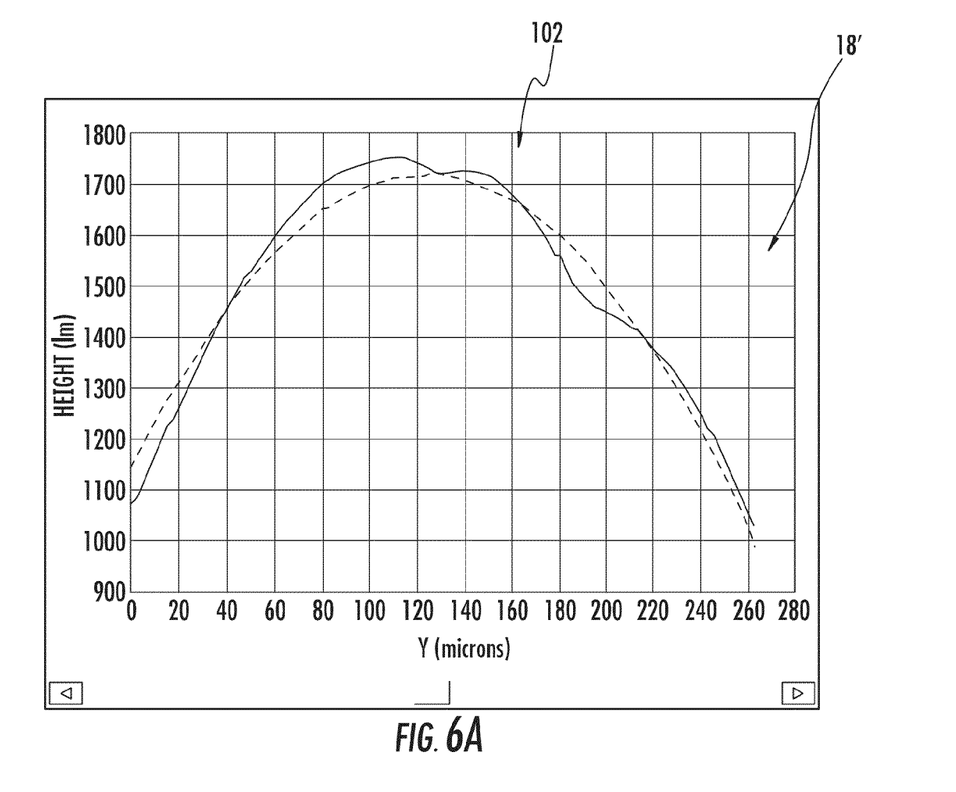
FIG. 6A is an exemplary Cartesian plot of an exemplary height and curvature of an optical surface formed in a ferrule assembly according to the process in FIG. 3.
Figure 6B:
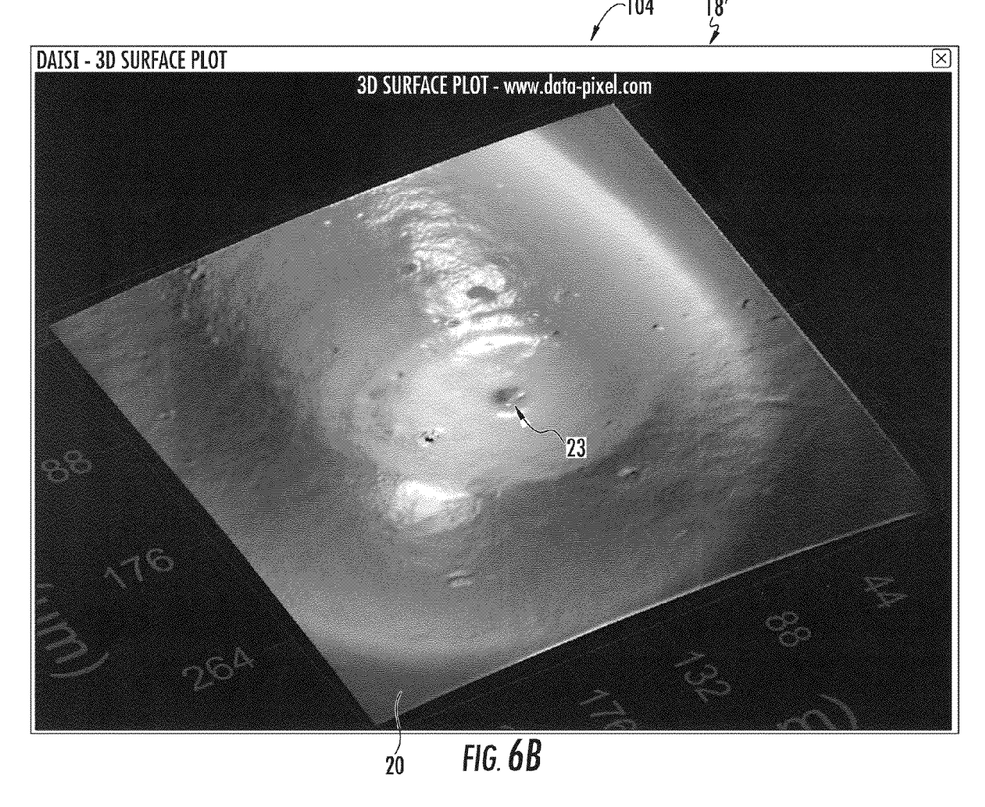
FIG. 6B is an exemplary three-dimensional (3-D) interferometric plot of height and curvature of an optical surface formed in a ferrule assembly according to the process in FIG. 3.

To further illustrate an exemplary optical surface 18 that can be thermally formed in a ferrule assembly according to the embodiments disclosed herein, the plots in FIGS. 6A and 6B are provided. FIG. 6A is an exemplary Cartesian plot 102 of an exemplary height and curvature of the optical surface 18' that may be thermally formed in the ferrule assembly 12 of FIGS. 1A and 1B according to the embodiments discussed herein. FIG. 6B is an exemplary three-dimensional (3-D) interferometric plot 104 of the exemplary height and curvature of the optical surface 18' plotted in FIG. 6A.

The ferrule, such as the ferrule 14, does not have to be uniformly manufactured from the same material or material composition. For example, it may be desired to provide the ferrule 14 that has a gradiated material or material composition having the same or similar thermal energy absorption characteristics as the optical fiber 16 proximate the second opening 23 of the ferrule 14. The material or material composition of the ferrule 14 could be less absorptive of wavelength energy that is absorptive to the material of the optical fiber 16 at outer portions of the end face 20 of the ferrule 14. In this manner, the outer portions of the ferrule 14 may not be thermally formed, while inner portions of the ferrule 14 are thermally formed at the end face 20 with the optical fiber 16.

Figure 7A:
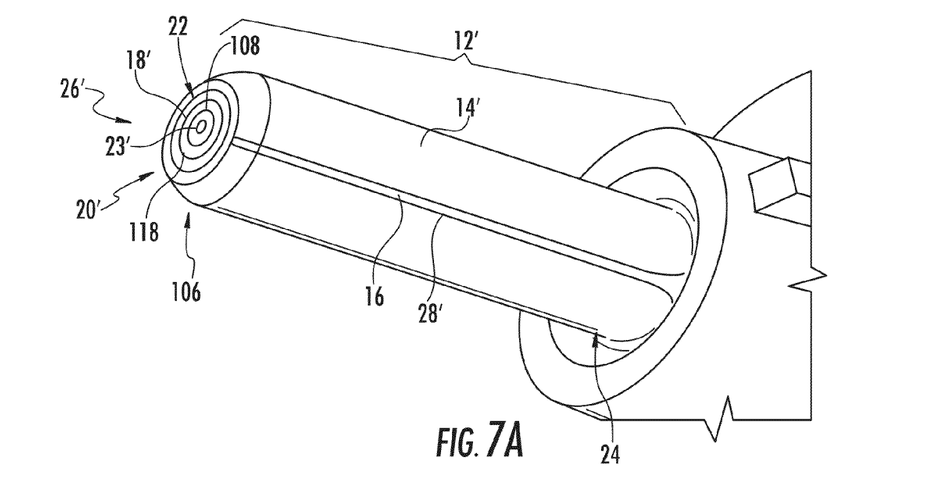
FIG. 7A is a perspective view of an exemplary gradient ferrule having an absorption gradient of ferrule material for the at least one wavelength disposed along a radial axis of the ferrule between an outer perimeter of the ferrule and an inner portion of the ferrule.
Figure 7B:
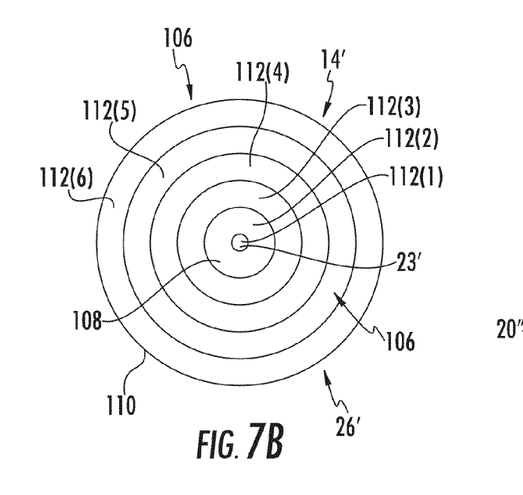
FIG. 7B is an end view of the gradient ferrule in FIG. 7A having a step-wise absorption gradient of ferrule material.

In this regard, FIG. 7A is a perspective view of an exemplary gradient material ferrule 14' as part of a ferrule assembly 12'. FIG. 7B is an end view of the gradient ferrule 14' in FIG. 7A having a step-wise gradient of ferrule material. The gradient ferrule 14' has an gradient of ferrule material 106. The gradient of ferrule material 106 has the same or similar thermal energy absorption characteristics of the optical fiber 16 disposed in inner portion(s) 108 at least proximate to the second opening 23' of the ferrule 14'. The gradient of ferrule material 106 is less absorptive or not absorptive to the wavelength or wavelengths absorptive by the optical fiber 16 in outer portion(s) 110 from the second opening 23' towards the outer perimeter of the ferrule 14'.

The gradient ferrule 14' in FIGS. 7A and 7B has a step-wise gradient of the ferrule material 106. In this regard, the ferrule 14' is formed from a plurality of concentric ferrule material layers 112, which is six concentric ferrule material layers 112(1)-112(6) in this example. The ferrule material layer 112(1) is most absorptive to the wavelength energy that is absorptive to the optical fiber 16. The concentric ferrule material layer 112(2) is less absorptive to the wavelength energy that is absorptive to the optical fiber 16 than the first concentric ferrule material layer 112(1) as a function of radius, and so on until ferrule material layer 112(6), which may not be absorptive to the wavelength energy that is absorptive to the optical fiber 16. In this manner, the inner portions 108 of the end face 20' of the ferrule 14 are thermally formed with the end portion 22 of the optical fiber 16 to provide an optical surface 18', and to a lesser amount toward the outer portions 110 of the end face 20' of the ferrule 14'. The outer portion 110 of the end face 20' of the ferrule 14' may not be thermally formed with the end portion 22 of the optical fiber 16.

Figure 7C:
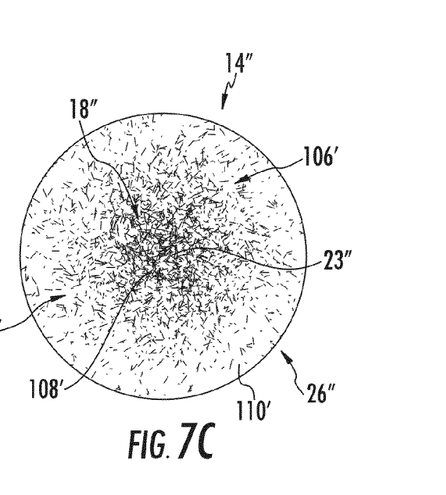
FIG. 7C is an end view of an exemplary gradient ferrule having a continuous absorption gradient of ferrule material for the at least one wavelength disposed along a radial axis of the ferrule between an outer perimeter of the gradient ferrule and an inner portion of the ferrule.

Also, a gradient ferrule does not have to provide a step-wise gradient of ferrule material. For example, FIG. 7C is an end view of an exemplary gradient ferrule 14" having a continuous absorption gradient of ferrule material 106". Like the ferrule 14' in FIG. 7B, the inner portions of the gradient ferrule 14" are comprised of ferrule material 106' or compositions that are most absorptive to the wavelength energy that is absorptive to the optical fiber 16. The outer portions 110' of the gradient ferrule 14' are less absorptive to the wavelength energy that is absorptive to the optical fiber 16 as a function of radius. In this manner, the inner portions 108 of the end face 20" of the ferrule 14" are thermally formed with the end portion 22 of the optical fiber 16 to provide an optical surface 18", and to a lesser amount toward the outer portions 110' of the end face 20' of the ferrule 14". The outer portion 110' of the end face 20" of the ferrule 14" may not be thermally formed with the end portion 22 of the optical fiber 16.

Figure 8:
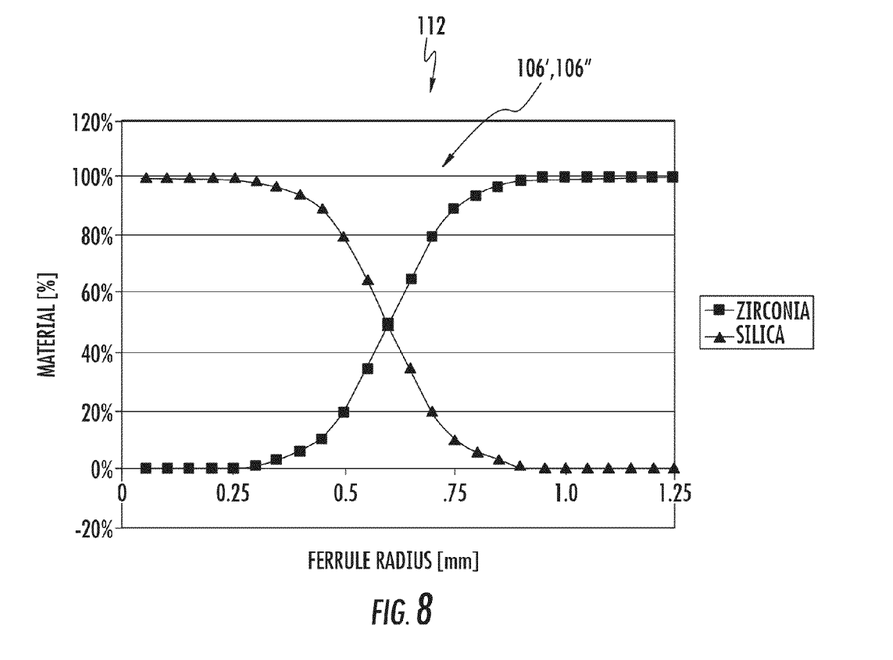
FIG. 8 is an exemplary plot of a ferrule comprised of a zirconia-silica gradient material to provide a zirconia-silica absorption gradient.

Different gradiated compositions of ferrule material of a gradient ferrule may be provided. For example, FIG. 8 contains an exemplary gradiated material composition plot 112 of a gradient material composition that may be employed in a ferrule provided herein. FIG. 8 shows a ferrule material composition of a zirconia-silica gradient ferrule as function of radius. As shown therein, at smaller radiuses of the ferrule 14', the composition of ferrule material 106, 106' is of material (e.g., silica) that is absorptive to the wavelengths that are absorptive to a silica optical fiber 16. At larger radiuses of the ferrule 14', the composition of ferrule material 106, 106' is of material (e.g., zirconia) that is not absorptive to the wavelengths that are absorptive to a silica optical fiber 16.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structures in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A ferrule assembly for a fiber optic connector, comprising:
    a ferrule comprising a first end, a second end opposite the first end along an optical axis, a ferrule bore extending between a first opening of the first end and a second opening of the second end, and an end face disposed at the second end, at least a portion of the end face absorptive to at least one wavelength;
    an optical fiber absorptive to the at least one wavelength, the optical fiber disposed in the ferrule bore of the ferrule, wherein an end portion of the optical fiber extends from the end face of the ferrule; and
    an optical surface formed by thermally forming both at least a portion of the end face of the ferrule and the end portion of the optical fiber by simultaneously exposing the end face of the ferrule and the end portion of the optical fiber to a laser beam of the at least one wavelength emitted by a laser;
    wherein the ferrule comprises an absorption gradient of ferrule material at the at least one wavelength disposed along a radial axis of the ferrule between an outer perimeter of the ferrule and an inner portion of the ferrule.

2. The ferrule assembly of claim 1, wherein the optical fiber and the at least a portion of the end face of the ferrule are configured to absorb at least twenty-five (25) percent of the energy of the at least one wavelength of the laser beam.

3. The ferrule assembly of claim 2, wherein the optical fiber is absorptive to the at least one wavelength when a one-hundred (100) micrometer thick sample of material of the optical fiber is configured to transmit no more than twenty-five (25) percent of the energy in the least one wavelength of the laser beam.

4. The ferrule assembly of claim 1, wherein the optical fiber is comprised of a silica material.

5. The ferrule assembly of claim 1, wherein the ferrule is comprised of a silica material.

6. The ferrule assembly of claim 5, wherein the silica material is doped with a titanium or titanium composite.

7. The ferrule assembly of claim 1, wherein the ferrule is comprised of borosilicate material.

8. The ferrule assembly of claim 1, wherein the ferrule is comprised of glass ceramic.

9. The ferrule assembly of claim 1, wherein the ferrule is not comprised of a zirconium oxide material.

10. The ferrule assembly of claim 1, wherein the ferrule has a lower coefficient of thermal expansion than zirconia.

11. The ferrule assembly of claim 1, wherein the gradient of the ferrule material is comprised of a continuous gradient of the ferrule material.

12. The ferrule assembly of claim 1, wherein the gradient of the ferrule material is comprised of a plurality of concentric ferrule material layers disposed about the radial axis of the ferrule, a concentric ferrule material layer disposed adjacent the outer perimeter of the ferrule having a lower coefficient of thermal expansion than a concentric ferrule material layer disposed adjacent the inner portion of the ferrule.

13. The ferrule assembly of claim 1, wherein the optical surface is thermally formed to have a radius of curvature between approximately 1 millimeter (mm) and 30 mm.

14. The ferrule assembly of claim 1, wherein the optical surface is thermally formed to be planar or substantially planar with the end face of the ferrule.

15. The ferrule assembly of claim 1, wherein the optical surface is thermally formed in the ferrule bore proximate the end face of the ferrule.

16. The ferrule assembly of claim 1, wherein the at least one wavelength is in a wavelength range from 3000 nm to 8000 nm.

17. The ferrule assembly of claim 1, wherein the at least one wavelength is in a wavelength range from 5200 nm to 5800 nm.

18. The ferrule assembly of claim 1, wherein the laser is comprised of a carbon dioxide laser.

19. The ferrule assembly of claim 1, wherein the laser is comprised of a carbon monoxide laser.

* * * * *